United States Patent
Gole et al.

(10) Patent No.: US 7,533,175 B1
(45) Date of Patent: May 12, 2009

(54) NETWORK ADDRESS RESOLUTION AND FORWARDING TCP/IP PACKETS OVER A FIBRE CHANNEL NETWORK

(75) Inventors: Abhijeet Gole, Campbell, CA (US); Naveen Bali, Cary, NC (US)

(73) Assignee: Network Appliance, Inc., Sunnyvale, CA (US)

( * ) Notice: Subject to any disclaimer, the term of this patent is extended or adjusted under 35 U.S.C. 154(b) by 1075 days.

(21) Appl. No.: 10/692,477

(22) Filed: Oct. 24, 2003

(51) Int. Cl.
*G06F 15/16* (2006.01)

(52) U.S. Cl. .................. 709/227; 370/355; 370/389

(58) Field of Classification Search ............... 709/218, 709/230, 208; 370/389, 355, 360, 252, 299; 714/4; 710/38; 711/156
See application file for complete search history.

(56) References Cited

U.S. PATENT DOCUMENTS

| | | | | |
|---|---|---|---|---|
| 6,353,612 | B1 * | 3/2002 | Zhu et al. ................ 370/360 |
| 7,031,904 | B1 * | 4/2006 | Wilson et al. ............ 709/230 |
| 7,042,877 | B2 * | 5/2006 | Foster et al. ............ 370/389 |
| 7,127,633 | B1 * | 10/2006 | Olson et al. ............... 714/4 |
| 7,231,430 | B2 * | 6/2007 | Brownell et al. ......... 709/218 |
| 7,237,045 | B2 * | 6/2007 | Beckmann et al. ........ 710/38 |
| 2002/0191602 | A1 * | 12/2002 | Woodring et al. ........ 370/389 |
| 2003/0091037 | A1 * | 5/2003 | Latif et al. ............. 370/355 |
| 2005/0025075 | A1 * | 2/2005 | Dutt et al. .............. 370/299 |
| 2005/0111378 | A1 * | 5/2005 | Chen et al. ............. 370/252 |
| 2007/0061526 | A1 * | 3/2007 | Coatney et al. .......... 711/156 |

OTHER PUBLICATIONS

Dave Ford, "Fc-VI Connection Definitions", Feb. 8, 1999, Orca Systems, 21 pages.*

* cited by examiner

*Primary Examiner*—Dustin Nguyen
(74) *Attorney, Agent, or Firm*—Blakely, Sokoloff, Taylor & Zafman LLP (57) ABSTRACT

A method comprising receiving a request for a connection over a network to an address is disclosed. The network conforms to a first network protocol, and the address conforms to a second network protocol. A field is compared to the network address. If the field matches the network address, a connection is established with a network node corresponding to the file. According to another embodiment of the invention, a Fibre Channel (FC) Virtual Interface (VI) is used to forward Transmission Control Protocol/Internet Protocol (TCP/IP) packets.

15 Claims, 9 Drawing Sheets

NETWORK ADDRESS RESOLUTION AND FORWARDING TCP/IP PACKETS OVER A FIBRE CHANNEL NETWORK

FIELD OF THE INVENTION

At least one embodiment of the present invention pertains to networked storage systems, and more particularly, to a method and apparatus for forwarding TCP/IP packets over a Fibre Channel network including resolving network addresses.

BACKGROUND

A file server is a type of storage server which operates on behalf of one or more clients to store and manage shared files in a set of mass storage devices, such as magnetic or optical storage based disks. The mass storage devices are typically organized as one or more groups of Redundant Array of Independent (or Inexpensive) Disks (RAID). One configuration in which file servers can be used is a network attached storage (NAS) configuration. In a NAS configuration, a file server can be implemented in the form of an appliance, called a filer, that attaches to a network, such as a local area network (LAN) or a corporate intranet. An example of such an appliance is any of the NetApp Filer products made by Network Appliance, Inc. in Sunnyvale, Calif.

A file server can be used to backup data, among other things. One particular type of data backup technique is known as "mirroring". Mirroring involves backing up data stored at a primary site by storing an exact duplicate (an image) of the data at a remote secondary site. The purpose is that, if data is ever lost at the primary site, it can be recovered from the secondary site.

A mirroring arrangement may be established between two filers. For example, a client may be connected to a first filer. The first filer, or source filer, stores data generated by the client. The client may be, for example, a bank that generates transactions, which are generally data access requests that modify or add data to a volume. The transactions modify data stored on a volume managed by the source filer and which is mirrored on an image volume managed by the destination filer to preserve the transactions for disaster recovery. The destination filer is connected to the source filer over a network. The destination filer is typically at a different physical location than the source filer, so that both filers will not be disabled by the same event. A destination filer can mirror several source filers, and a source filer can mirror to several destination filers.

The destination filer can be stored at a remote location. A network may couple the two filers to facilitate communication between them. Each filer may be considered a "node" connected to the network. Nodes on a network communicate with each other by sending packets that use the same network protocol. Each node on the network has a network address that identifies that node. For example, if a source and a destination filer are connected over a Transmission Control Protocol/Internet Protocol (TCP/IP) network, the source and the destination filer will each have a unique Internet Protocol (IP) address.

To establish a connection between the source filer and the destination filer over a TCP/IP network, a source filer establishes a connection with the destination filer using the destination filer's IP address. In some instances, a source filer requests a connection using an IP address, and the destination filer is accessible only over a Fibre Channel (FC) network. An FC network uses Fibre Channel Identifications (FCIDs) as node addresses. The source and destination filers may each have both IP addresses and FCIDs. If the source filer requests a connection with an IP address over a FC network, the IP address will have to be resolved into the appropriate FCID. An FC link encapsulation (FC-LE) standard known as FCIP allows FC to encapsulate TCP/IP packets. However, FCIP is not widely supported by FC switches, and many FC users prefer not to use FCIP. Therefore, what is needed is an alternative method for resolving IP addresses into FCIDs. Further, what is also needed is an alternative method for using FC to forward TCP/IP packets.

SUMMARY

A method comprising receiving a request for a connection over a network to an address is disclosed. The network conforms to a first network protocol, and the address conforms to a second network protocol. A field is compared to the network address. If the field matches the network address, a connection is established with a network node corresponding to the file.

Other aspects of the invention will be apparent from the accompanying figures and from the detailed description which follows.

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION

Described herein is a method and apparatus for Network Address Resolution and Forwarding TCP/IP Packets over a Fibre Channel Network. Note that in this description, references to "one embodiment" or "an embodiment" mean that the feature being referred to is included in at least one embodiment of the present invention. Further, separate references to "one embodiment" or "an embodiment" in this description do not necessarily refer to the same embodiment; however, such embodiments are also not mutually exclusive unless so stated, and except as will be readily apparent to those skilled in the art from the description. For example, a feature, structure, act, etc. described in one embodiment may also be included in other embodiments. Thus, the present invention can include a variety of combinations and/or integrations of the embodiments described herein.

According to an embodiment of the present invention, a network packet conforming to a first network protocol is forwarded over a network conforming to a second network protocol. In a specific embodiment, Transmission Control Protocol/Internet Protocol (TCP/IP) packets are forwarded over a Fibre Channel (FC) network. A software stack contains several layers to facilitate the transmission of TCP/IP packets over an FC network without using the FC-LE standard.

According to another embodiment of the present invention, a first network node, which may be a storage server such as a filer, is coupled to a network. A second network node, which may also be a storage server such as a filer, is also coupled to the network. The first network node may try to establish a connection with the second network node using a destination network address conforming to a first network protocol. The network conforms to a second, different network protocol. In order to establish the connection, the destination network address is resolved from the first protocol to the second protocol. A name server coupled to the network stores a profile for each network node, containing both an address conforming to the first protocol and a corresponding address conforming to the second protocol. In order to resolve the destination network address from the first protocol to the second protocol, the name server is queried and the profiles are searched to find the destination network address conforming to the first network protocol. Once the appropriate profile is found, the address conforming to the second protocol can be extracted and a connection established.

Figure 1:
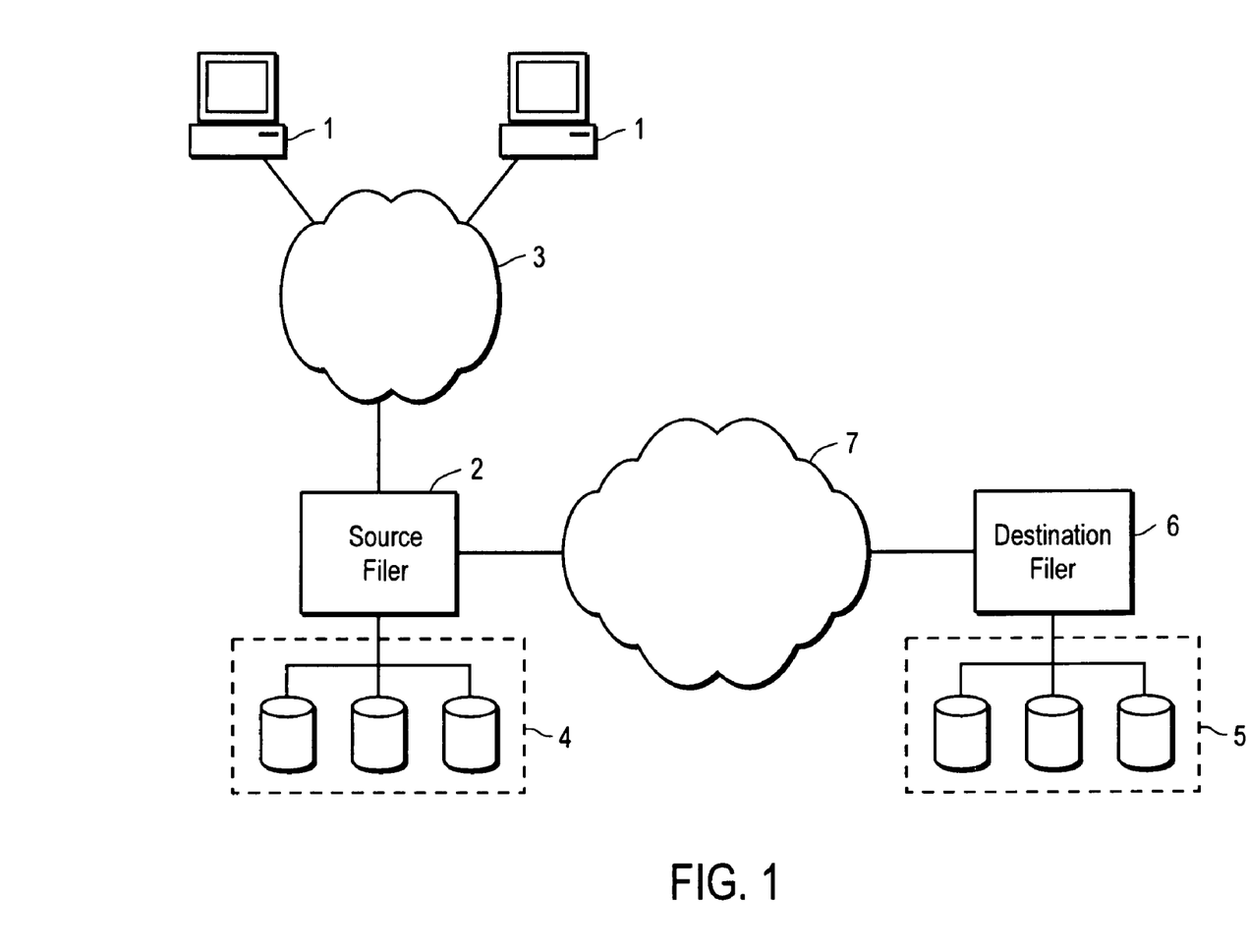
FIG. 1 illustrates an example of a network configuration to facilitate data backup using mirroring.

FIG. 1 illustrates an example of a network configuration to facilitate data backup using mirroring. A number of client processing systems ("clients") 1 are coupled to a filer 2 located at a primary site through a first network 3, such as a LAN. Each of the clients 1 may be, for example, a conventional personal computer (PC), workstation, or the like. The filer 2 provides the clients 1 with access to files stored on a first set of mass storage devices 4, such as magnetic or optical disks, which may be configured as one or more RAID groups. Data stored in mass storage devices 4 is considered to be the primary copy, which is mirrored on a second set of mass storage devices 5 located at a remote secondary site, access to which is controlled by a second filer 6. In this description, the first filer 2 is referred to as the "source filer" 2, while the second filer 6 is referred to as the "destination filer" 6. The source filer 2 and destination filer 6 are coupled to each other through a network 7, such as a WAN.

Note that the configuration of FIG. 1 is a simple one, selected for this description to facilitate explanation of the techniques introduced herein. However, these techniques can also be applied in many other different network configurations. For example, in some alternative configurations, the destination filer 6 may serve a separate set of clients coupled to it. As another example, at least some of mass storage devices 5 may be configured to operate under the direct control of the source filer 2 and/or at least some of mass storage devices 4 may be configured to operate under the direct control of the destination filer 6 (i.e., a cluster-failover configuration). Furthermore, in some configurations, one or more additional filers may be coupled to the source filer 2 and/or to the destination filer 6.

Figure 2:
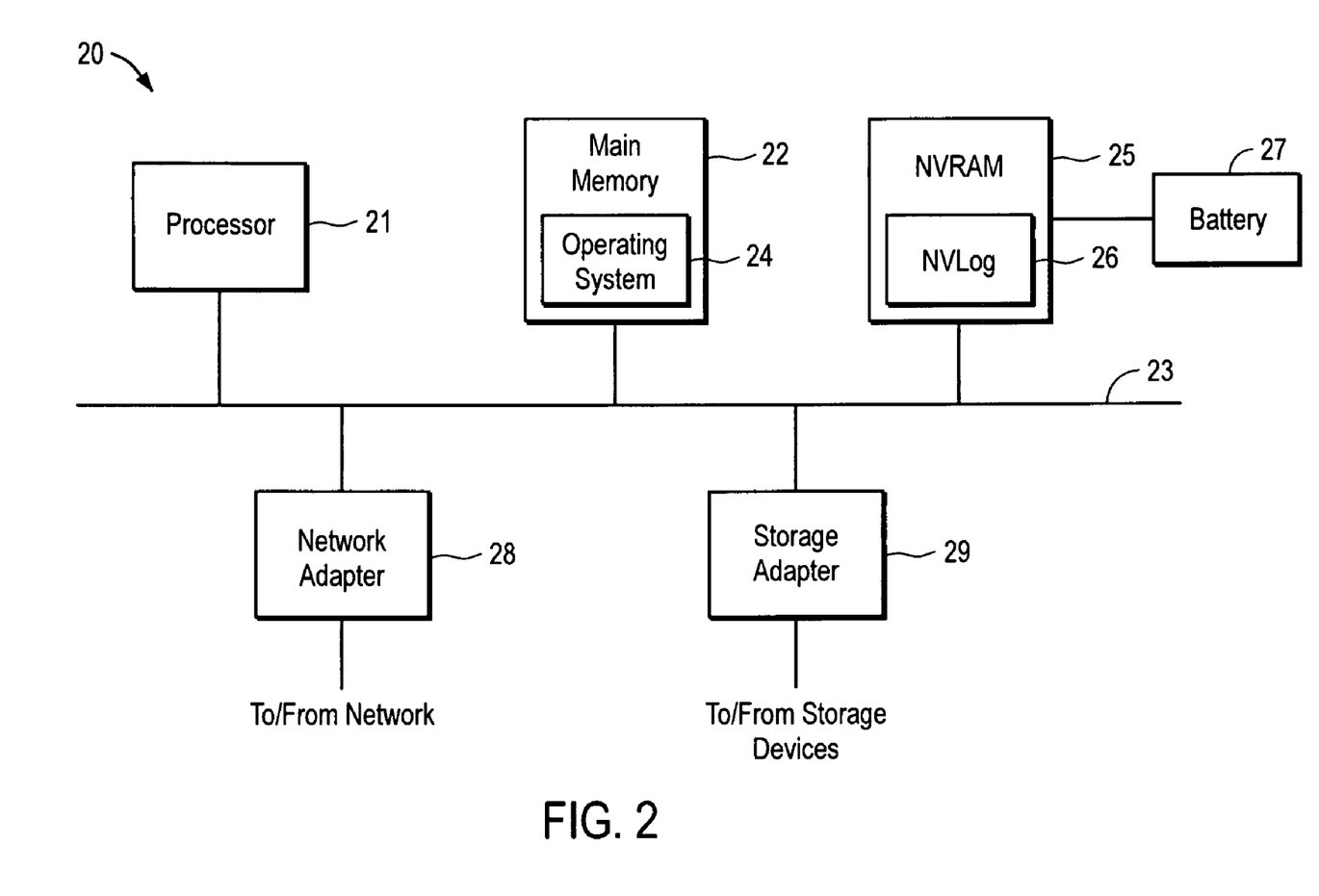
FIG. 2 is a conceptual block diagram of the architecture of a filer.

FIG. 2 shows the architecture of a filer 20, representative of the source filer 2 or the destination filer 6, according to certain embodiments of the invention. Note that certain standard and well-known components which are not germane to the present invention are not shown. The filer 20 includes a processor 21 and main memory 22, coupled together by a bus system 23. The bus system 23 in FIG. 2 is an abstraction that represents any one or more separate physical buses and/or point-to-point connections, connected by appropriate bridges, adapters and/or controllers. The bus system 23, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The processor 21 is the central processing unit (CPU) of the filer 20 and, thus, controls the overall operation of the filer 20. In certain embodiments, the processor 21 accomplishes this by executing software stored in main memory 22. The processor 21 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

The main memory 22, which is generally some form of random access memory (RAM), stores the operating system 24 of the filer 20. Techniques of the present invention may be implemented within the operating system 24, as described further below. Also connected to the processor 21 through the bus system 23 are a network adapter 28 and a storage adapter 29. The network adapter 28 provides the filer 20 with the ability to communicate with remote devices, such as clients and/or another filer, over a network and may be, for example, an Ethernet adapter. The storage adapter 29 allows the filer to access the external mass storage devices and may be, for example, a Fibre Channel (FC) adapter or SCSI adapter.

Figure 3:
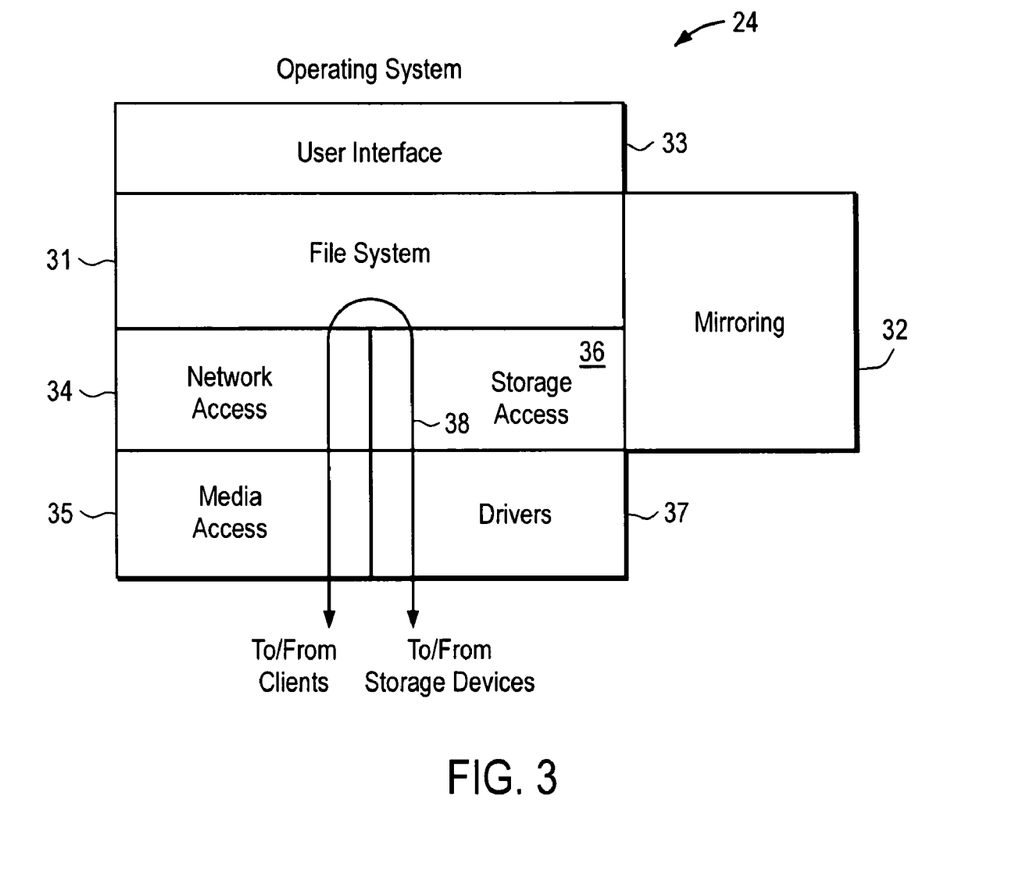
FIG. 3 is a block diagram of the operating system of a filer.

FIG. 3 illustrates the operating system 34 of the filer 20, according to certain embodiments of the invention. As can be seen, the operating system 24 includes a number of layers. The core of the operating system 24 is the file system 31 which, among other responsibilities, executes read and write operations on the mass storage devices in response to client requests, maintains directories, and manages consistency point operations. An example of a file system suitable for this purpose is the Write Anywhere File Layout to (WAFL) file system from Network Appliance, such as used in the NetApp Filers. The file system 31 operates on blocks of data of a predetermined size, such as 4 Kbytes. Also shown in FIG. 3 is the logical data path 38 from clients to mass storage devices, through the file system 31.

Above the file system 31, the operating system 24 also includes a user interface 33, through which a network administrator or other user can control and/or configure the filer (e.g., remotely from a management station). The user interface 33 may generate a command line interface and/or a graphical user interface for this purpose.

Below the file system 31, on the client side the operating system 24 includes a network layer 34 and, at the lowest level, a media access layer 35. The network access layer 34 implements any of various protocols used to communicate with client devices, such as network file system (NFS), common Internet file system (CIFS) and/or hypertext transport protocol (HTTP). The media access layer 35 includes one or more drivers which implemented the protocols used to communicate over the network, such as Ethernet.

Below the file system 31 on the storage device side, the operating system 24 includes a storage access layer 36 and, at the lowest level, a driver layer 37. The storage access layer 36 implements a disk storage protocol such as RAID, while the driver layer 37 implements a lower-level storage device access protocol, such as Fibre Channel or SCSI.

The operating system of 24 also includes a mirroring module 32, which is operatively coupled to the file system 31 and the storage access layer 36. The mirroring module 32 controls the synchronization of data at the remote secondary site with data stored at the primary site. The techniques introduced herein may be implemented at least partially using the mirroring module 32.

Figure 4:
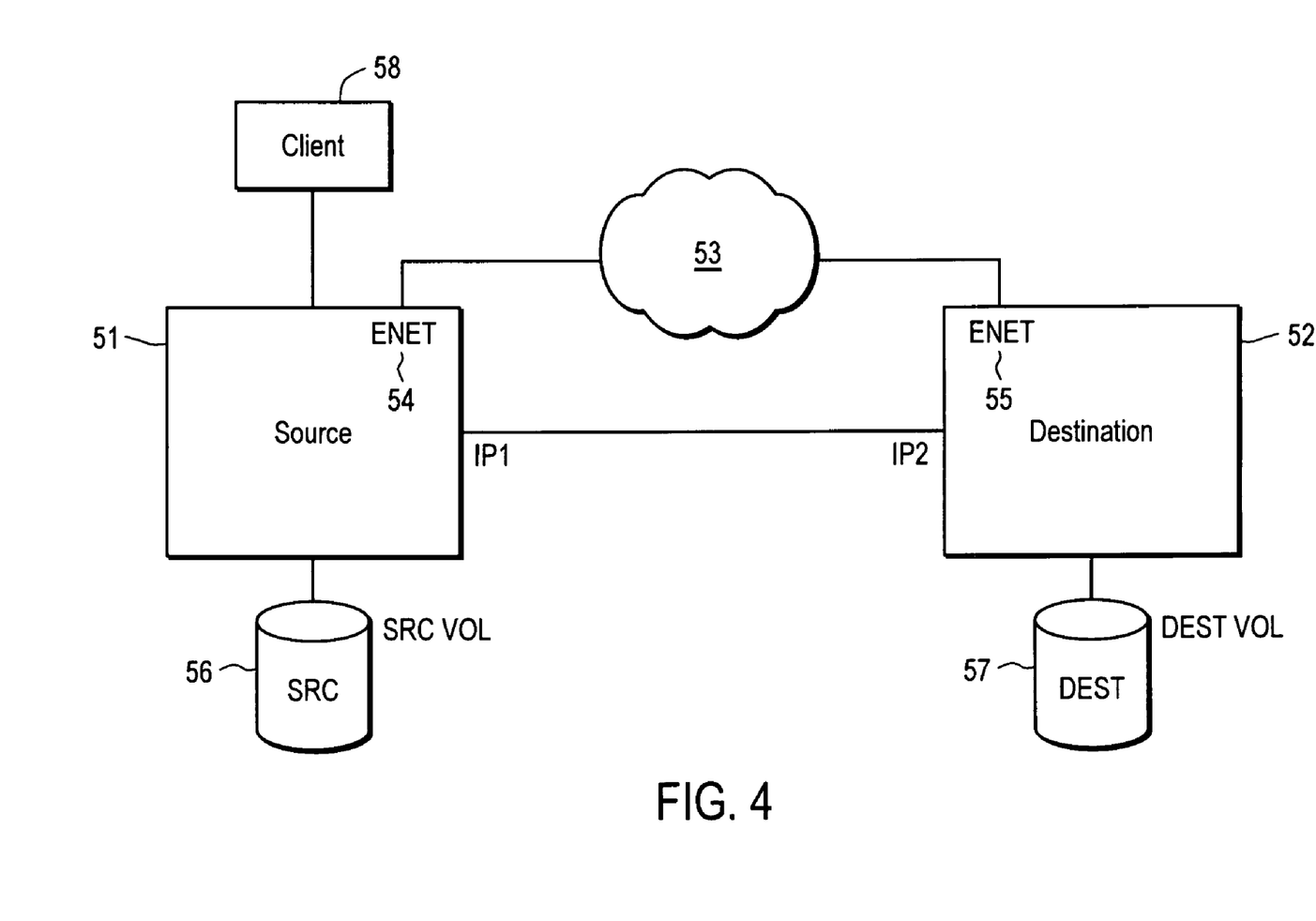
FIG. 4 illustrates a networked mirroring relationship.

FIG. 4 illustrates a networked mirroring relationship. A source filer 51 is mirrored by a destination filer 52. These filers are network storage appliances configured to control storage of, and access to, data in a set of interconnected storage volumes. The source filer 51 and destination filer 52 are coupled by a network 53. Here, the network 53 is a TCP/IP network. The source filer 51 is coupled to the TCP/IP network 53 through an Ethernet port 54, and the destination filer 52 is coupled to the network 53 through an Ethernet port 55. Assume that the Ethernet port 53 has an IP address of "IP1", while the Ethernet port 54 has an IP address of "IP2". A source volume 56, having an identifier "SRCVOL" contains the data stored by the source filer 51. The source volume 56 is mirrored on a destination volume 57 having an identifier "DESTVOL." The source 56 and destination 57 volumes may be an array of disks, such as a RAID.

A client 58 is coupled to the source filer 51. The client 58 may be a bank or point of sale (POS) terminal, for example. The client 58 may be coupled to the source filer 51 over a network such as a TCP/IP network. When the client 58 makes data access requests to the data stored on the source volume 56, those requests will be mirrored on the destination image volume 57. The client 58 may request to modify or add data on the source volume 56. In order to maintain the mirror, the destination volume 57 would have to likewise be modified. The data access requests made by the client 58 are sent over the network 53 to the destination filer 52, and the destination filer 52 applies the changes to the destination image volume 57.

Figure 5:
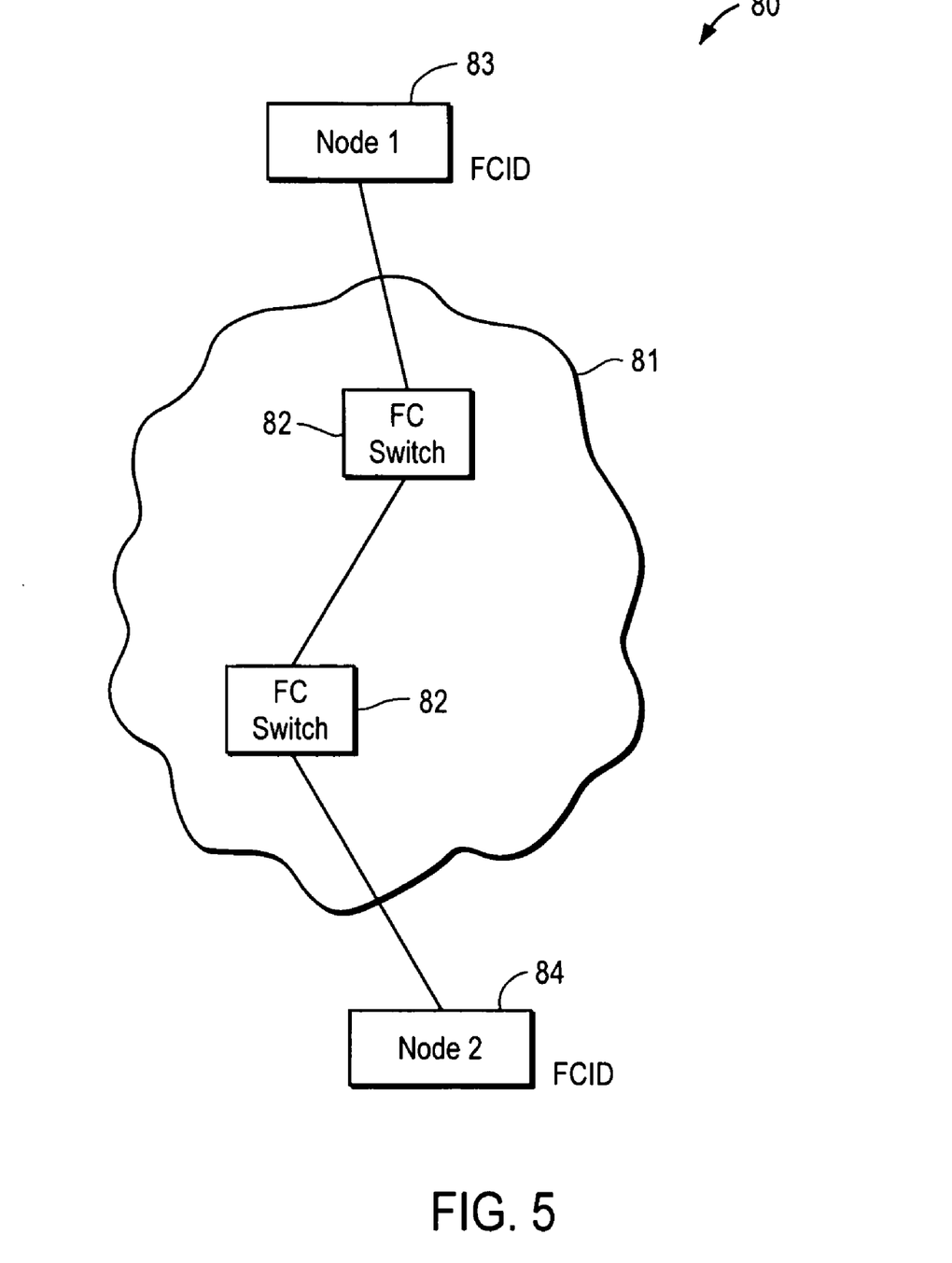
FIG. 5 illustrates a Fibre Channel (FC) network.

FIG. 5 illustrates a Fibre Channel (FC) network. The FC network 80 comprises a "fabric" 81. The fabric 81 is the heart of the network 80. The fabric 81 comprises several switches 82, which direct network traffic. The switches 82 may comprise several different types of switches, all having different functions. The network 80 has two network nodes, node 83 and node 84, attached to it. The nodes (or hosts) 83 and 84 each have a unique FCID. The nodes 83 and 84 may be a source and destination filer, such as the filers 51 and 52 in FIG. 1A. The nodes 83 and 84 may also be storage devices, such as disks or RAID controllers.

To establish a connection over the fabric 81 and communicate between the nodes 83 and 84, a node can use a "Virtual Interface" (VI). The Fibre Channel Virtual Interface (FCVI) protocol allows hosts to connect with each other. Once a connection is established between the two nodes, it is a direct-channeled connection, and unlike with a TCP/IP network, the FCIDs need never be referenced again. The VI connection is established by following these steps:

1. Find the FCID of the destination node
2. Send a VI connection request
3. Establish a VI connection between the two nodes Currently, to establish a connection over a fabric using IP addresses, the FCIP protocol can be used. Unfortunately, many FC switches do not support the FCIP protocol, so the FCIP protocol cannot be used over many FC networks.

Figure 6:
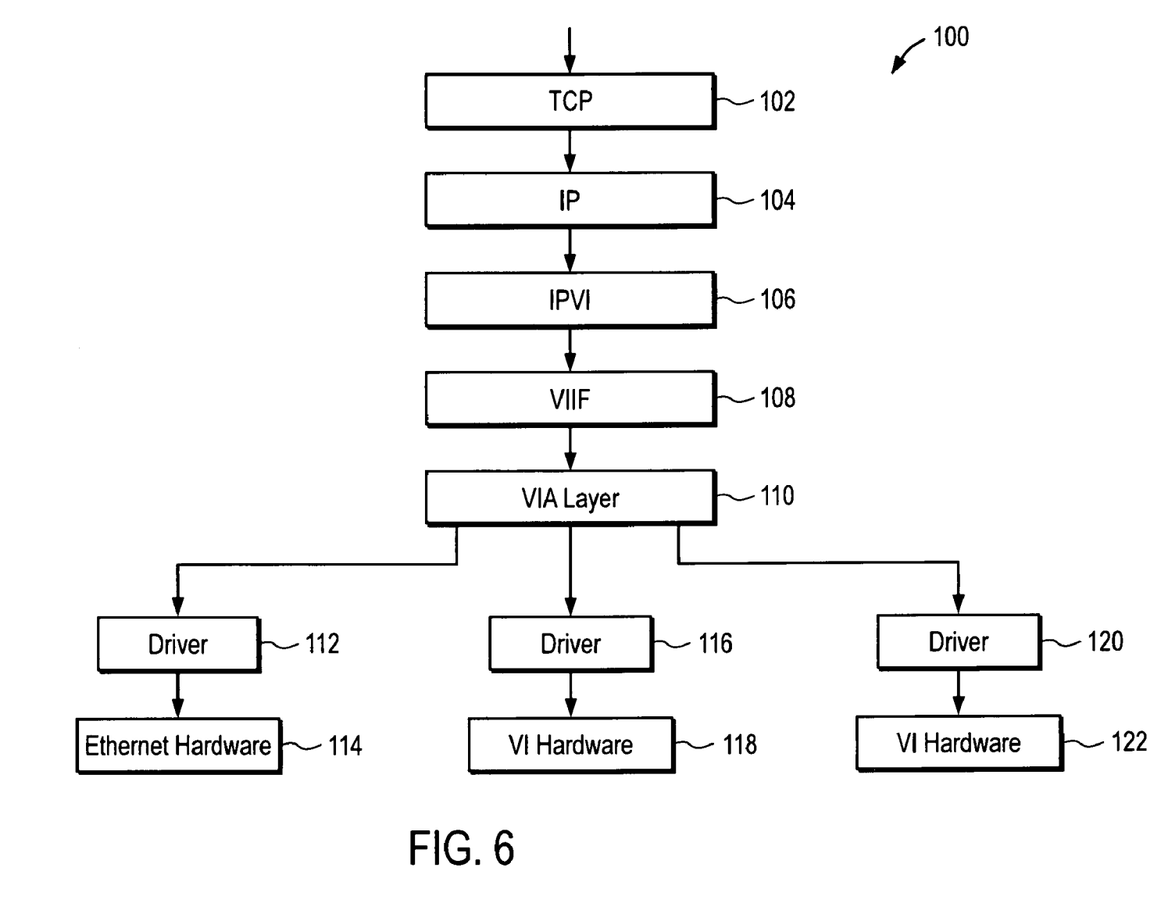
FIG. 6 illustrates a VI software stack that can be used by a filer according to an embodiment of the present invention.

FIG. 6 illustrates a VI software stack 100 that can be used by a filer according to an embodiment of the present invention. A TCP layer 102 generates TCP headers for incoming packets and then sends the packets to the IP layer 104. The IP layer 104 adds an IP header to the packet. The IPVI layer 106 receives the packet, including the TCP and IP headers. The IPVI layer 106 examines the IP header, and determines the IP destination of the packet. The IPVI layer 106 then queries a VI Interface (VIIF) layer 108 to determine if there is an open VI to the requested IP address. The VIIF layer 108 is a VI interface layer, which serves as an interface between VI and IP. If it is determined that there is a VI between the requesting filer and the IP address, the data in the packet is sent through the VI.

If there is no VI established, the VIIF layer 108 can initiate a vi_connect request, which can then resolve the IP address to the appropriate FCID. The packet is then sent to the VIA layer 110. The VIA layer 110 is a VI Application Program Interface (API). The VIA layer 110 hides the different network types from the above layers. In other words, the VIA layer 110 makes all packets look like VI packets. The VIA layer 110 controls the multiple types of hardware connected to it. For example, the driver 112 controls the Ethernet hardware 114, the driver 116 controls the VI hardware 118, and the driver 120 controls the VI hardware 122. The drivers 112, 116, and 120 issue connect requests forwarded from the network hardware. The VI hardware 118 and 122 supports VI commands, including vi_send_msg and vi_recv_msg to send and receive packets.

Figure 7:
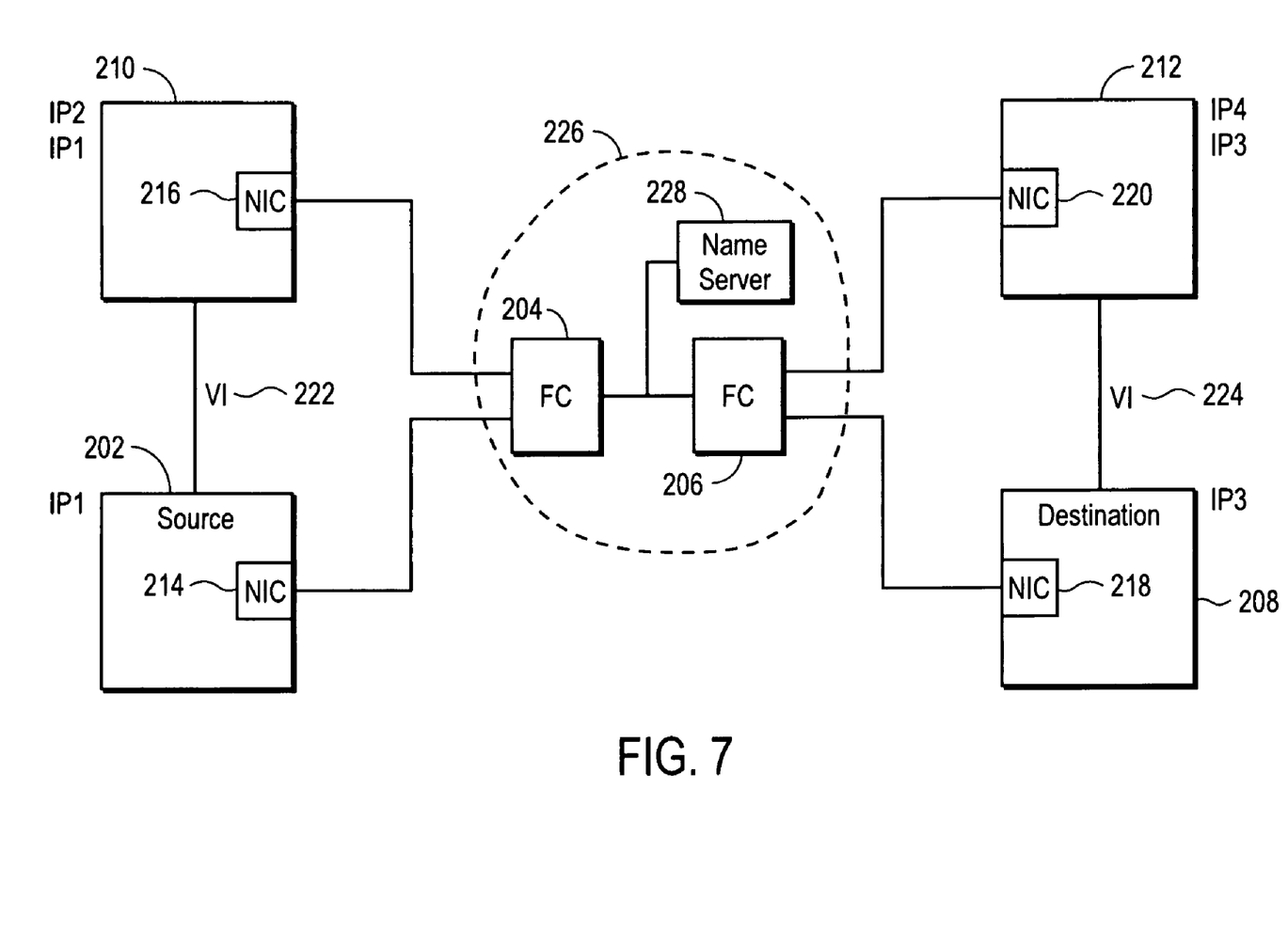
FIG. 7 illustrates a mirroring relationship over an FC network.

FIG. 6 illustrates a mirroring relationship over an FC network. A source filer 202 is coupled to an FC switch 204. The FC switch 204 is coupled to another FC switch 206, which is coupled to a destination filer 208. The source 202 and destination 208 filers each have a corresponding failover (backup) filer 210 and 212, respectively. The failover filers 210 and 212 assume the operations of the corresponding source 202 and destination 208 filers, respectively, if either filer fails.

The source filer 202 has Network Interface Card (NIC) 214 such as an Ethernet card that is configured to have an IF address of 'IP1', and the source failover filer 210 has an NIC 216 that is configured to have an IP address of 'IP2'. The destination filer 208 has an NIC 218 that is configured to have an IP address of 'IP3', and the destination failover filer 212 has an NIC 220 that is configured to have an IP address of 'IP4'. The filers 202, 208, 210, and 212 may be accessed by establishing a connection with the IP addresses of their respective NICs 214, 216, 218, and 220. When either of the source 202 or destination filers 208 fails, the corresponding failover filer 210 or 212 assumes the IP address of the disabled filer. For example, if the source filer 202 were to fail, the source failover filer 210 would assume the IP address IP1 while still maintaining the IP address IP2. The source 210 and destination 212 failover filers maintain an identical image of the source 202 and destination 208 filers, so that if the source 202 or destination 208 filer goes down, the failover filers 210 and 212 can seamlessly resume the operations of the corresponding filer.

The source filer 202 sends updates to the destination filer 208 through the FC fabric 226. If the source filer 202 requires a connection with the destination filer 208, the source filer 202 can establish a VI connection. The source filer can, through associated software layers, issue VI commands to establish the connection. First, a vi_create command is issued to create a VI. Second, a vi_connect command is issue to connect the two nodes. Finally, the source and destination filers 202 and 208 can issue vi_send_msg and vi_recv_msg commands to send and receive data. To establish a connection on an FC network, the vi_connect command needs to send a connect request to the destination by specifying its FCID.

The destination filer 208 is accessible via the IP address IP3. To establish a VI between the source filer 202 and the destination filer 208, the source filer 202 needs to resolve the IP address IP3 into an FCID corresponding to the destination filer 208. A name server 228 in the fabric 226 maintains a database of information about the fabric 226. For every host connected to the fabric 226, the name server 228 maintains several fields including Port ID, Port Name, Node Name, FCID, etc. fields. The FCID field provides the FCID for the specific host.

The node name field stores the IP address of the host. The node name field is typically a 256-byte field that is associated with a specific FCID. For example, the node name field stores the value 'IP3' for the destination filer 208. The node name field may also be partitioned, the first partition storing the IP address of the host, and the second storing the IP address of the failover filer for that host. Using the partitioned field, the node name field would contain the 'IP3' address for the destination filer 208, and the 'IP4' address for the destination failover filer 212.

Figure 8A:
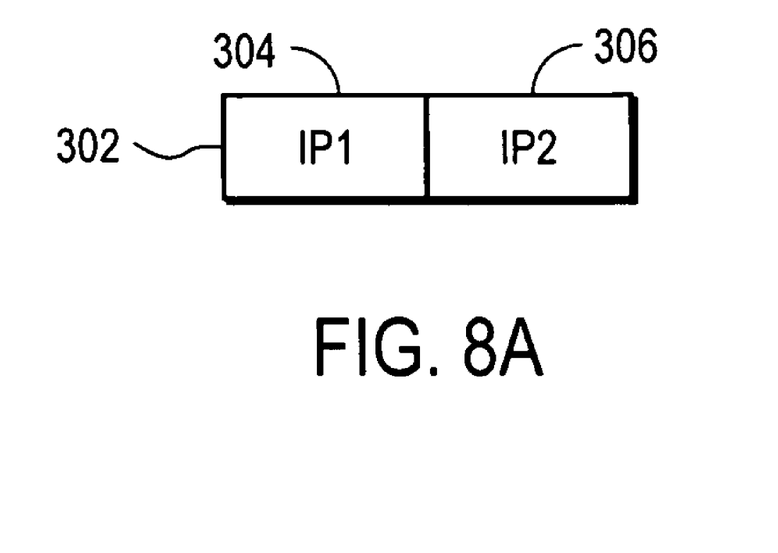
FIGS. 8A and 8B illustrate node name fields.
Figure 8B:
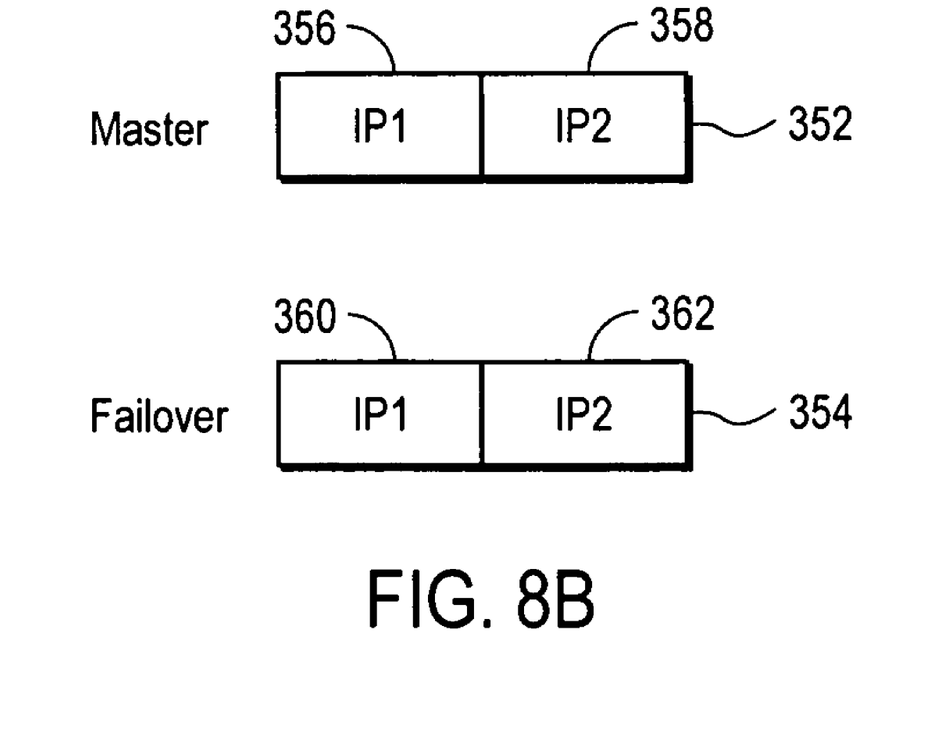

FIGS. 8A and 8B illustrate node name fields. A node name field 302 has two partitions 304 and 306. The node name field 302 is for a master filer, such as the source filer 202. The IP address of the master filer is stored in the first partition 304. The IP address of the failover filer is stored in the second partition 306. FIG. 8B illustrates node name fields for a cluster failover configuration. The master field 352 is similar to the node name field 302. The IP address of the master filer is stored in the first partition 356, and the IP address of the failover filer is stored in the second partition 358. The failover field 354 contains the IP address of the failover filer in the first partition 360, and will add the IP address of the master filer to the second partition 362 if the master filer goes down. When the master filer is operating normally, the second partition 362 is empty.

To resolve an IP address into an FCID, the name server 228 is queried. The symbolic names of the ports in the name server 228 are searched to find the port whose symbolic name matches the requested IP address. Once the requested IP address has been found, the address is resolved by determining which FCID corresponds to the matching node name field.

A failover filer assumes the IP address of the master filer when the master filer is disabled. The failover filer will then be accessible through its own IP address as well as the IP address of the master filer. Therefore, a failover filer will store the IP address of the master filer in the second partition 362 of the node name field 354 when the master filer is disabled. When using a cluster failover setup, the name server 228 searches the second partition of the node name first, and if the requested IP address is found in the second partition, the IP address is resolved for the corresponding failover filer. In other words, the IP address stored in the second partition is given precedence over the IP address stored in the first partition. This way, a source filer 202 can request a connection with a destination filer 208, and even if the destination filer 208 is disabled, the source filer 202 will seamlessly connect with the identical destination failover filer 212. If no match is found in the second partition of the node name field, the first partition is searched, and the requesting filer is connected with the master filer.

Figure 9:
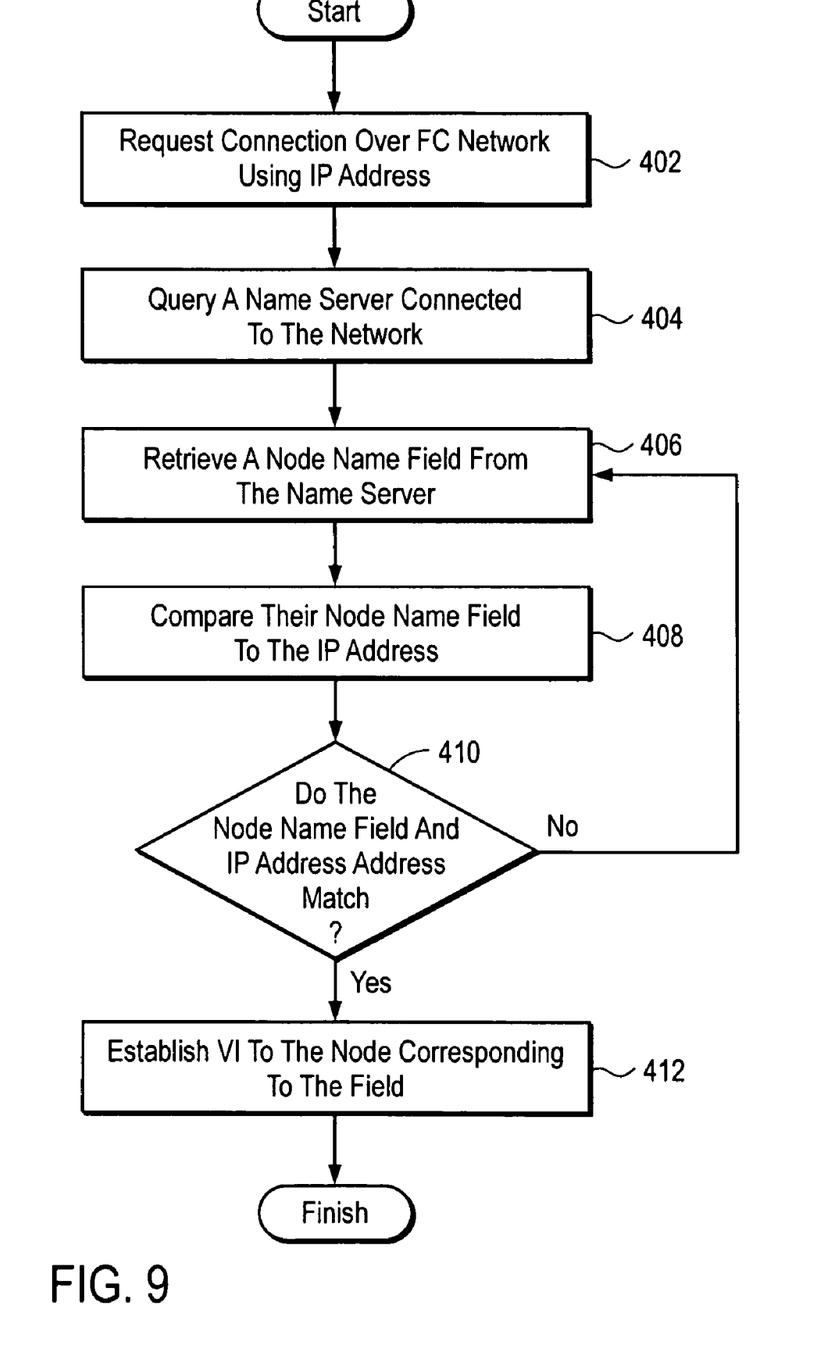
FIG. 9 is a flow diagram for a process of resolving an IP address according to an embodiment of the invention which may be implemented in an FC network.

FIG. 9 is a flow diagram for a process of resolving an IP address according to an embodiment of the invention which may be implemented in an FC network. In block 402, a connection is requested over an FC network using an IP address. For example, the connection may be requested by the source filer 202 to the destination filer 208. The connection may be a VI connection. Since the network is an FC network, an FCID that corresponds to the IP address is determined to enable the VI. Although the FC network and the IP address are specifically mentioned here, it is understood that any two disparate networks may also be used.

In block 404, a name server is queried. The name server, such as the name server 228, is a part of the FC fabric and contains a set of fields corresponding to every host found on the FC network. In block 406, a node name field is retrieved from the name server. The node name field includes an IP address corresponding to a specific FCID field. In block 408, the node name field is compared to the IP address. In block 410, if the node name field and the requested IP address match, the FCID can be determined by finding the FCID that corresponds to the particular node name field. If the node name field and the address do not match, the name server should retrieve the next node name field, and again compare it to the requested address.

In block 412, once the correct FCID has been determined, a VI can be established between the requesting node and the node corresponding to the correct node name field. Once the VI has been established, the two nodes can communicate with each other using the vi_send_msg and vi_recv_msg commands.

The techniques introduced above have been described in the context of a NAS environment. However, these techniques can also be applied in various other contexts. For example, the techniques introduced above can be applied in a storage area network (SAN) environment. A SAN is a highly efficient network of interconnected, shared storage devices. One difference between NAS and SAN is that in a SAN, the storage server (which may be an appliance) provides a remote host with block-level access to stored data, whereas in a NAS configuration, the storage server provides clients with file-level access to stored data. Thus, the techniques introduced above are not limited to use in a file server or in a NAS environment.

This invention has been described with reference to specific exemplary embodiments thereof. It will, however, be evident to persons having the benefit of this disclosure that various modifications changes may be made to these embodiments without departing from the broader spirit and scope of the invention. Specification and drawings are accordingly, to be regarded in an illustrative rather than in a restrictive sense.

What is claimed is:

1. A machine-implemented method for a storage system to transmit an IP packet over a Fibre Channel (FC) network, the method comprising:

accessing an FC name server database in response to a request for a connection over the FC network with a destination IP address;

discovering an FC network address corresponding to the destination IP address by searching a plurality of subfields in the FC name server database according to positions of the plurality of subfields, the FC name server database comprising a master field for a master storage server and a failover field for a failover storage server for the master storage server, wherein the master and failover fields are each partitioned into first and second subfields, the second subfield of the failover field stores an IP address for the master storage server if the master storage server fails, and wherein the second subfields are searched prior to searching the first subfields;

establishing the connection over the FC network using the discovered FC network address; and transmitting the IP packet using the established connection over the FC network;

wherein the plurality of subfields are positioned in a symbolic node name field of the FC name server database.

2. A machine-implemented method as recited in claim 1, wherein discovering the FC network address corresponding to the destination IP address comprises:

obtaining from an FC name server a plurality of values for the plurality of subfields;

searching the plurality of values until finding a match with the destination IP address; and obtaining from the FC name server the FC network address corresponding to a value for a subfield of the plurality of subfields, which has the match with the destination IP address.

3. A machine-implemented method for a storage system to transmit an IP packet over a Fibre Channel (FC) network, the method comprising:

querying an FC name server for the FC network to retrieve a symbolic node name field from an FC name server database;

receiving from the FC name server a plurality of values for the symbolic node name field;

searching the plurality of values for a destination IP address according to positions of a plurality of subfields in the symbolic node name field, the FC name server database comprising a master field for a master storage server and a failover field for a failover storage server for the master storage server, wherein the master and failover fields are each partitioned into first and second subfields, the second subfield of the failover field stores an IP address for the master storage server if the master storage server fails, and wherein the second subfields are searched prior to searching the first subfields;

obtaining from the FC name server an FC network address corresponding to the destination IP address;

establishing the connection over the FC network using the obtained FC network address; and transmitting the JP packet using the established connection over the FC network.

4. A machine-implemented method as recited in claim 3, wherein searching the plurality of values for the symbolic node name fields comprises:

searching the second subfields of the master and failover fields for the destination IP address; and searching the first subfields of the master and failover fields if no match has been found with the destination IP address in the second subfields.

5. A machine-implemented method as recited in claim 3, wherein obtaining from the FC name server the FC network address comprises querying the FC name server to retrieve the FC network address corresponding to a subfield of the plurality of subfields, which has the match with the destination IP address.

6. A storage system for transmitting an IP packet over a Fibre Channel (FC) network, the storage system comprising:

a processor;

a network adapter coupled to the processor to connect the storage system to the FC network; and a memory coupled to the processor to store program code, which when executed by the processor, cause the processor to perform a method comprising:

accessing an FC name server database in response to a request for a connection over the FC network with a destination IP address;

discovering an FC network address corresponding to the destination IP address by searching a plurality of subfields in the FC name server database according to positions of the plurality of subfields, the FC name server database comprising a master field for a master storage server and a failover field for a failover storage server for the master storage server, wherein the master and failover fields are each partitioned into first and second subfields, the second subfield of the failover field stores an IP address for the master storage server if the master storage server fails, and wherein the second subfields are searched prior to searching the first subfields;

establishing the connection over the FC network using the discovered FC network address; and transmitting the IP packet using the established connection over the FC network;

wherein the plurality of subfields are positioned in a symbolic node name field of the FC name server database.

7. A storage system as recited in claim 6, wherein discovering the FC network address corresponding to the destination IP address comprises:

obtaining from an FC name server a plurality of values for a field in the FC name server database, wherein the field contains the plurality of subfields;

searching the plurality of values for the field until finding a match with the destination IP address; and obtaining from the FC name server the FC network address corresponding to a value for the field, which has the match with the destination IP address.

8. A storage system for transmitting an IP packet over a Fibre Channel (FC) network, the storage system comprising:

a processor;

a network adapter coupled to the processor to connect the storage system to the FC network; and a memory coupled to the processor to store program code, which when executed by the processor, cause the processor to perform a method comprising:

querying an FC name server for the FC network to retrieve a symbolic node name field from an FC name server database;

receiving from the FC name server a plurality of values for the symbolic node name field;

searching the plurality of values for a destination IP address according to positions of a plurality of subfields in the symbolic node name field, the FC name server database comprising a master field for a master storage server and a failover field for a failover storage server for the master storage server, wherein the master and failover fields are each partitioned into first and second subfields, the second subfield of the failover field stores an IP address for the master storage server if the master storage server fails, and wherein the second subfields are searched prior to searching the first subfields;

obtaining from the FC name server an FC network address corresponding to the destination IP address;

establishing the connection over the FC network using the obtained FC network address; and transmitting the IP packet using the established connection over the FC network.

9. A storage system as recited in claim 8, wherein searching the plurality of values for the symbolic node name fields comprises:

searching the second subfields of the master and failover fields for the destination IP address; and searching the first subfields of the master and failover fields if no match has been found with the destination IP address in the second subfields.

10. A storage system as recited in claim 8, wherein obtaining from the FC name server the FC network address comprises querying the FC name server to retrieve the FC network address corresponding to a subfield of the plurality of subfields, which has the match with the destination IP address.

11. A machine-readable medium to store program code, which when executed by a processor, cause the processor to perform a method for transmitting an IP packet over a Fibre Channel (FC) network, the method comprising:

accessing an FC name server database in response to a request for a connection over the FC network with a destination IP address;

discovering an FC network address corresponding to the destination IP address by searching a plurality of subfields in the FC name server database according to positions of the plurality of subfields, the FC name server database comprising a master field for a master storage server and a failover field for a failover storage server for the master storage server, wherein the master and failover fields are each partitioned into first and second subfields, the second subfield of the failover field stores an IP address for the master storage server if the master storage server fails, and wherein the second subfields are searched prior to searching the first subfields;

establishing the connection over the FC network using the discovered FC network address; and     transmitting the IP packet using the established connection over the FC network;

wherein the plurality of subfields are positioned in a symbolic node name field of the FC name server database.

12. A machine-readable medium as recited in claim 11, wherein discovering the FC network address corresponding to the destination IP address comprises:

obtaining from an FC name server a plurality of values for the plurality of subfields;

searching the plurality of values until finding a match with the destination IP address; and     obtaining from the FC name server the FC network address corresponding to a value for a subfield, which has the match with the destination IP address.

13. A machine-readable medium to store program code, which when executed by a processor, cause the processor to perform a method for transmitting an IP packet over a Fibre Channel (FC) network, the method comprising:

querying an FC name server for the FC network to retrieve a symbolic node name field from an FC name server database;

receiving from the FC name server a plurality of values for the symbolic node name field;

searching the plurality of values for a destination IP address according to positions of a plurality of subfields in the symbolic node name field, the FC name server database comprising a master field for a master storage server and a failover field for a failover storage server for the master storage server, wherein the master and failover fields are each partitioned into first and second subfields, the second subfield of the failover field stores an IP address for the master storage server if the master storage server fails, and wherein the second subfields are searched prior to searching the first subfields;

obtaining from the FC name server an FC network address corresponding to the destination IP address;

establishing the connection over the FC network using the obtained FC network address; and     transmitting the IP packet using the established connection over the FC network.

14. A machine-readable medium as recited in claim 13, wherein searching the plurality of values for the symbolic node name fields comprises:

searching the second subfields of the master and failover fields for the destination IP address; and     searching the first subfields of the master and failover fields if no match has been found with the destination IP address in the second subfields.

15. A machine-readable medium as recited in claim 13, wherein obtaining from the FC name server the FC network address comprises querying the FC name server to retrieve the FC network address corresponding to a subfield of the plurality of subfields, which has the match with the destination IP address.

* * * * *